Oct. 7, 1930.                    C. H. HARDIE                    1,777,490
                                GEAR MECHANISM
                             Filed Dec. 23, 1929
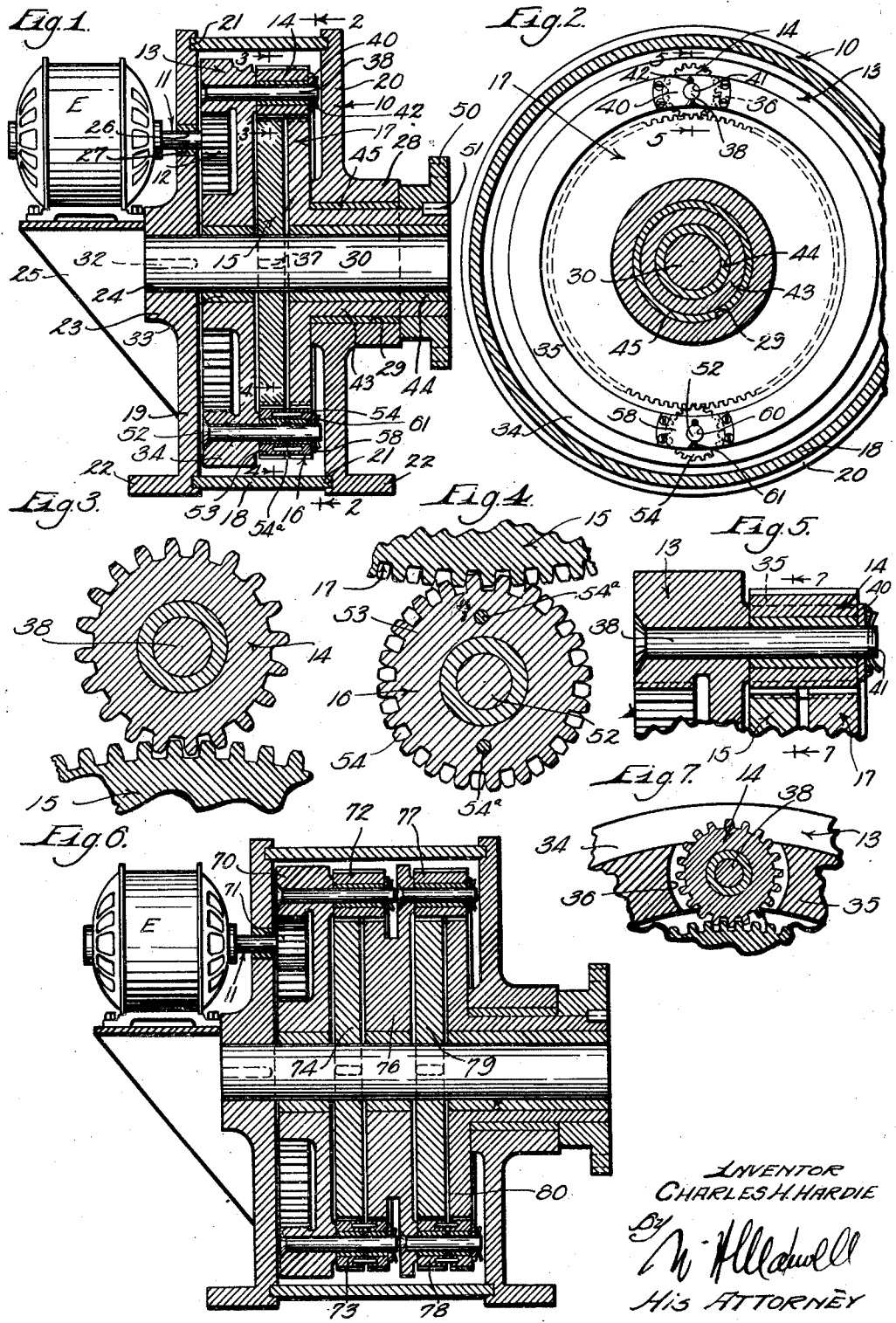
INVENTOR
CHARLES H. HARDIE
BY
His ATTORNEY Patented Oct. 7, 1930

1,777,490

UNITED STATES PATENT OFFICE

CHARLES H. HARDIE, OF SOUTH GATE, CALIFORNIA

GEAR MECHANISM

Application filed December 23, 1929. Serial No. 416,052.

This invention relates to a gear mechanism and relates more particularly to a speed reduction device.

It is a general object of the invention to provide a practical, effective speed reduction device.

It is another object of the invention to provide a speed reduction device that has a maximum speed reduction ratio for a minimum number of working parts.

It is another object of the invention to provide a device of the character mentioned wherein a high speed, or drive pinion drives a freely rotatable gear which carries a planetary pinion meshing with a fixed gear and a low speed or driven gear having a different number of teeth than the fixed gear.

It is another object of the invention to provide a speed reducer of the character mentioned in which a split planetary pinion is carried by the freely rotatable gear which has a part meshing with a fixed gear and a part meshing with the driven gear, or low speed gear.

It is another object of the invention to provide a speed reduction device of the character mentioned particularly adapted to be used in connection with an electric motor.

Other objects and features of my invention will be best and more fully understood from the following detailed description of typical forms and application of the invention, throughout which description reference is had to the accompanying drawings, in which:

Fig. 1 is a vertical detailed sectional view of the device provided by this invention illustrating it in connection with a typical electric motor. Fig. 2 is a vertical detailed sectional view taken as indicated by line 2—2 on Fig. 1. Fig. 3 is an enlarged vertical sectional view taken as indicated by line 3—3 on Fig. 1. Fig. 4 is an enlarged vertical sectional view taken as indicated on line 4—4 on Fig. 1. Fig. 5 is an enlarged vertical detailed sectional view taken substantially as indicated by line 5—5 on Fig. 2. Fig. 6 is a vertical detailed sectional view of another form of the invention. Fig. 7 is a vertical detailed sectional view taken as indicated by line 7—7 on Fig. 5.

The speed reduction device provided by the present invention is applicable to various uses and may be used in connection with various sources of power. In the following detailed description I will describe the invention in connection with a typical electric motor. It is to be understood, however, that the invention is not to be limited to the particular form or application about to be described, but it is to be taken as including any features or modifications that may fall within the scope of the claims.

The device provided by the present invention includes, generally, a housing 10, a drive shaft or high speed shaft 11 driven by the electric motor E and carrying a drive pinion 12, a freely rotatable internal gear 13 within the housing 10 driven by the pinion 12, two planetary pinions 14 and 16 carried by the gear 13, a fixed or stationary gear 15 about which the planetary pinions operate, and a driven gear or low speed gear 17 driven by the planetary pinions 14 and 16.

The housing 10 is provided to encase the other parts of the device and may be of any suitable construction. In the form of the invention illustrated in the drawings, the housing 10 includes a cylindrical body portion 18 and end plates 19 and 20 closing the ends of the body portion 18. The end plates 19 and 20 may be provided with annular recesses or grooves 21 to receive the ends of the body portion 18. The end plates 19 and 20 may be provided with suitable base or supporting flanges 22. The end plate 19 is provided with a central outwardly projecting boss 23 having a central bearing opening 24. In the particular case illustrated, a bracket 25 is mounted on the outer side of end plate 19. The bracket 25 supports the motor E and carries the motor so that the motor shaft 11 extends parallel with the central axis of the body. The shaft 11 extends through an opening 26 in the end plate 19 to project into the housing 10.

A suitable bushing 27 may be provided in the opening 26.

The end plate 20 is provided with a central outwardly projecting boss 28. The boss 28 is provided with a comparatively large central opening 29. A fixed shaft 30 is carried in the opening 24 of the plate 19 and extends through the housing and through the opening 29. The shaft 30 may be fixed to the end plate 19 in any suitable manner; for example, it may be keyed to the plate 19 by the key 32.

The freely rotatable gear 13 is mounted within the housing 10 to freely rotate about the shaft 30. The gear 13 is preferably an internal gear so that the device may be embodied in a compact structure. A suitable bushing or bearing 33 may be provided to mount the gear 13 on the shaft 30. In accordance with the invention, the gear 13 is mounted adjacent the inner side of the end plate 19 and is driven by the high speed pinion 12. An inwardly projecting flange 35 is provided on the peripheral portion 34 of the gear 13. Two longitudinally extending sockets or openings 36 are provided in the flange 35. The sockets 36 are preferably diametrically opposite and are comparatively large, extending the entire depth of the flange 35 and being open at the outer and inner sides of the flange 35.

The fixed gear 15 is mounted on the shaft adjacent the inner side of the internal gear 13. The gear 15 may be held against rotation relative to the shaft 30 by a suitable key 37. The gear 15 is of slightly less diameter than the inner side of the flange 35 so that it is arranged within the flange. The fixed or stationary gear 15 is provided to operate or carry the pinions 14 and 16 and to cause the pinions to rotate to drive the driven gear 17.

The planetary pinion 14 is rotatably mounted in one of the sockets 36 to operate over the fixed gear 15. The pinion 14 is rotatably carried on a stud 38 extending through the peripheral portion 34 of the internal gear and extending through the socket 36. The stud 38 extends in parallel alignment with the stationary shaft 30 and carries the pinion 14 so that it effectively meshes with the teeth on the periphery of the fixed or stationary gear 15 and the driven gear 17. The pinion 14 is comparatively long so that it extends beyond the edge of the fixed gear 15.

In accordance with the invention, means are provided for retaining the pinion 14 on the stud 38 and for effectively supporting the outer end of the stud 38. A retaining plate 40 is mounted on the outer side of the flange 35 and extends completely over the socket 36. The plate 40 is provided with an opening 41 which passes the end portion of the stud 38. A suitable key 42 may extend transversely through the end portion of the stud 38 to engage the plate 40 and hold the stud against longitudinal movement.

The pinion 16 may be located diametrically opposite the pinion 14 and operates the same as the pinion 14 in driving the gear 17. The pinion 16 is mounted in the socket 36 opposite the pinion 14. The planetary pinion 16 is mounted in the socket 36 in the same manner that the pinion 14 is mounted. A stud 52 is carried by the internal gear 13 and extends longitudinally through the socket 36. The pinion 16 has two portions 53 and 54 at which the teeth are in different rotative positions. In practice it is desirable to form the pinion 16 in two parts or sections 53 and 54 fixed together against relative rotation by pins $54^a$ or other suitable means. Section 53 meshes with the teeth of the fixed or stationary gear 15 while section 54 meshes with the teeth of the driven gear 17. The sections 53 and 54 of the pinion 16 may be retained on the stud 52 by a plate 58 attached to the flange 35 and extending over the socket 36. The plate 58 is provided with an opening 60 passing the outer end portion of the stud 52. The plate 58 operates to support the stud 52. A key 61 may extend transversely through the end portion of the stud 52 and engage the outer side of the plate 58. It will be obvious that there may be more than two planetary pinions provided on the gear 13 where the device is to transmit heavy loads or drives.

The driven gear 17 is rotatably mounted on the fixed shaft 30 adjacent the stationary gear 15. The gear 17 has an effective diameter the same as that of the fixed gear 15 and has an axially extending hub 43 which extends through the opening 29 of the end plate 20. In practice, a bushing 44 may mount the gear 17 on the shaft 30. The driven or low speed gear 17 is driven by the pinions 14 and 16. In accordance with the invention, the gear 17 has a different number of teeth than the gear 15. It is preferred that the variation in number of teeth on the gears 14 and 17 be slight, say, for instance, one or two teeth. The pinions 14 and 16 operated or rotated by the teeth of the fixed gear 15 rotate a certain number of times with each revolution of the internal gear 13.

It will be seen that by providing the gear 17 with a different number of teeth than carried by the gear 15 that the gear 17 will rotate relative to the stationary gear 15. It is to be further understood that the direction in which the low speed gear 17 is driven depends upon the relative number of teeth of the gears 15 and 17, that is, it depends upon whether the low speed gear 17 has a greater or less number of teeth than the gear 15.

A bushing 45 may be provided between the exterior of the hub 43 and the walls of the opening 29. Suitable means may be provided for connecting the low speed gear 17 with the part to be driven or operated. In the drawings I have illustrated a section 50 of a coupling keyed on the outer end of the hub 43 by a key 51.

In Fig. 6 of the drawings I have illustrated a form of the invention similar to that described above, except that it embodies two phases or two cycles of speed reduction. In this form of the invention the freely rotatable internal gear 70 is driven by a high speed pinion 71 and carries two planetary pinions 72 and 73 similar in construction to the planetary pinions 14 and 16 described above. The pinions 72 and 73 mesh with a fixed gear 74 and drive a first driven gear 76. The gear 76 carries at its periphery two planetary pinions 77 and 78 similar to the pinions 72 and 73. The pinions 77 and 78 engage a fixed gear 79 and drive a second driven or low speed gear 80.

It is believed that the operation of the device provided by the present invention will be understood from the foregoing detailed description. It will be seen that the internal gear 13 rotates slower than the pinion 12. The pinions 14 and 16, by meshing with the fixed gear 15 and the driven gear 17, operate to shift the driven gear 17 very slightly upon each rotation of the free gear 13. The amount of movement of the driven gear 17 relative to the fixed gear 15 depends upon the respective number of teeth of these two gears. Further, the direction in which the driven or low speed gear 17 is operated relative to the fixed gear 15 depends upon whether the driven gear 17 is provided with fewer or more teeth than the stationary gear 15. The pinions 14 and 16 being diametrically opposite operate to equalize the forces transmitted to the driven gear. It is to be particularly noted that the device embodies but few parts and gives a very great reduction of speed. The retaining plates 40 and 58 prevent the studs 38 and 52 from being forced out of alignment and are a feature of the invention.

Having described only a typical, preferred form of my invention, I do not wish to limit myself to the specific details set forth, but wish to reserve to myself any changes or variations that may appear to those skilled in the art or fall within the scope of the following claims:

Having described my invention, I claim:

1. A device of the character described including, a housing, a shaft extending through the housing and stationary relative to the housing, an internal gear freely rotatable on the shaft, an axial flange on the periphery of the internal gear having spaced sockets, a drive shaft extending into the housing, a pinion on the drive shaft adapted to rotate the internal gear, a gear fixed on the stationary shaft adjacent the internal gear, a driven gear rotatable on the stationary shaft and having a different number of teeth than the fixed gear, and a planetary pinion mounted within each of the sockets in the internal gear engaging the teeth of the fixed gear and the driven gear.

2. A speed reducing device including, a housing, a shaft extending into the housing and held stationary relative to the housing, a gear in the housing freely rotatable on the shaft, means for rotating the said gear, a gear fixed on the shaft, a driven gear rotatable on the shaft and having a different number of teeth than the fixed gear, a stud carried in the peripheral portion of the first-mentioned gear and extending into a socket in the first-mentioned gear, a pinion rotatably mounted on the stud within the socket and engaging the teeth of the fixed gear and the driven gear, and means retaining the pinion on the stud.

3. A speed reducing device including, a housing, a shaft extending into the housing and held stationary relative to the housing, a gear in the housing freely rotatable on the shaft, means for rotating the said gear, a gear fixed on the shaft, a driven gear rotatable on the shaft and having a different number of teeth than the fixed gear, a stud carried in the peripheral portion of the first-mentioned gear and extending into a socket in the first-mentioned gear, a pinion rotatably mounted on the stud within the socket and engaging the teeth of the fixed gear and the driven gear, and means retaining the pinion on the stud and supporting the end portion of the stud.

4. A speed reducing device including, a housing, a shaft extending into the housing and held stationary relative to the housing, a gear in the housing freely rotatable on the shaft, means for rotating the said gear, a gear fixed on the shaft, a driven gear rotatable on the shaft and having a different number of teeth than the fixed gear, a stud carried in the peripheral portion of the first-mentioned gear and extending into a socket in the first-mentioned gear, a pinion rotatably mounted on the stud within the socket and engaging the teeth of the fixed gear and the driven gear, and means retaining the pinion on the stud and supporting the end portion of the stud, said last-mentioned means including a plate attached to the first-mentioned gear extending over the socket and having an opening passing the stud.

5. A speed reducing device including, a housing, a shaft extending into the housing and stationary relative to the housing, a drive pinion in the housing, an internal gear freely rotatable on the shaft and driven by the drive pinion, an axial flange on the peripheral portion of the internal gear having diametrically opposite openings, a gear adjacent the internal gear fixed to the shaft, a driven gear adjacent the fixed gear rotatable on the shaft and having a different number of teeth than the fixed gear, axial studs on the internal gear extending into the openings, and a pinion on each of the studs engaging the teeth of both the fixed gear and the driven gear, and means retaining the pinions on the studs and supporting the ends of the studs.

In witness that I claim the foregoing I have hereunto subscribed my name this 8th day of November, 1929.

CHARLES H. HARDIE.